May 3, 1938.  F. FINK  2,116,194
SAFETY DEVICE FOR SAW TABLES
Filed March 26, 1937  2 Sheets-Sheet 2

INVENTOR
FERDINAND FINK
BY William J Barnes
ATTORNEY

Patented May 3, 1938

2,116,194

UNITED STATES PATENT OFFICE 2,116,194

SAFETY DEVICE FOR SAW TABLES

Ferdinand Fink, Newark, N. J., assignor to National Ice Supply Company, an unincorporated association consisting of Anthony M. Meyerstein and Theodore Meyerstein, Nutley, N. J.

Application March 26, 1937, Serial No. 133,116

4 Claims. (Cl. 143—38)

This invention relates to a safety device for saw tables. It has particular reference to ice cubing machines which employ saws to cut relatively small cubes from a large block of ice, and is adapted to protect the hands of the operator from the kerfing and cut-off saws.

In ice cubing machines of the type to which one embodiment of the present invention is particularly adapted, the block of ice is placed in an opening in a longitudinally movable carriage and rests upon the saw table. Then the carriage is moved so that the ice is forced through the kerfing saws which cut a series of parallel kerfs in the block corresponding in depth to one dimension of the desired cubes. The distances between these saws correspond to the other dimensions of the cubes. The block is then withdrawn from the saws to its original position, rotated 90 degrees and again passed through the kerfing saws. After being again restored to its original position it is moved transversely of the machine until it is in alinement with the cut-off saw. The carriage is pushed forward once more and this saw which is at a height above the table corresponding to the depths of the kerfs in the block, cuts off the cubes which then fall down to a delivery chute.

Heretofore the carriage has been so constructed that the various saws are protected only when the carriage is in retracted position. When the carriage is in either operating position, that is, when the kerfs or the cut-off are being made, the saws not in use are exposed and constitute a potential source of danger to the operator. By the use of the present invention this danger is removed because the saws are fully protected at all times.

Figure 1:
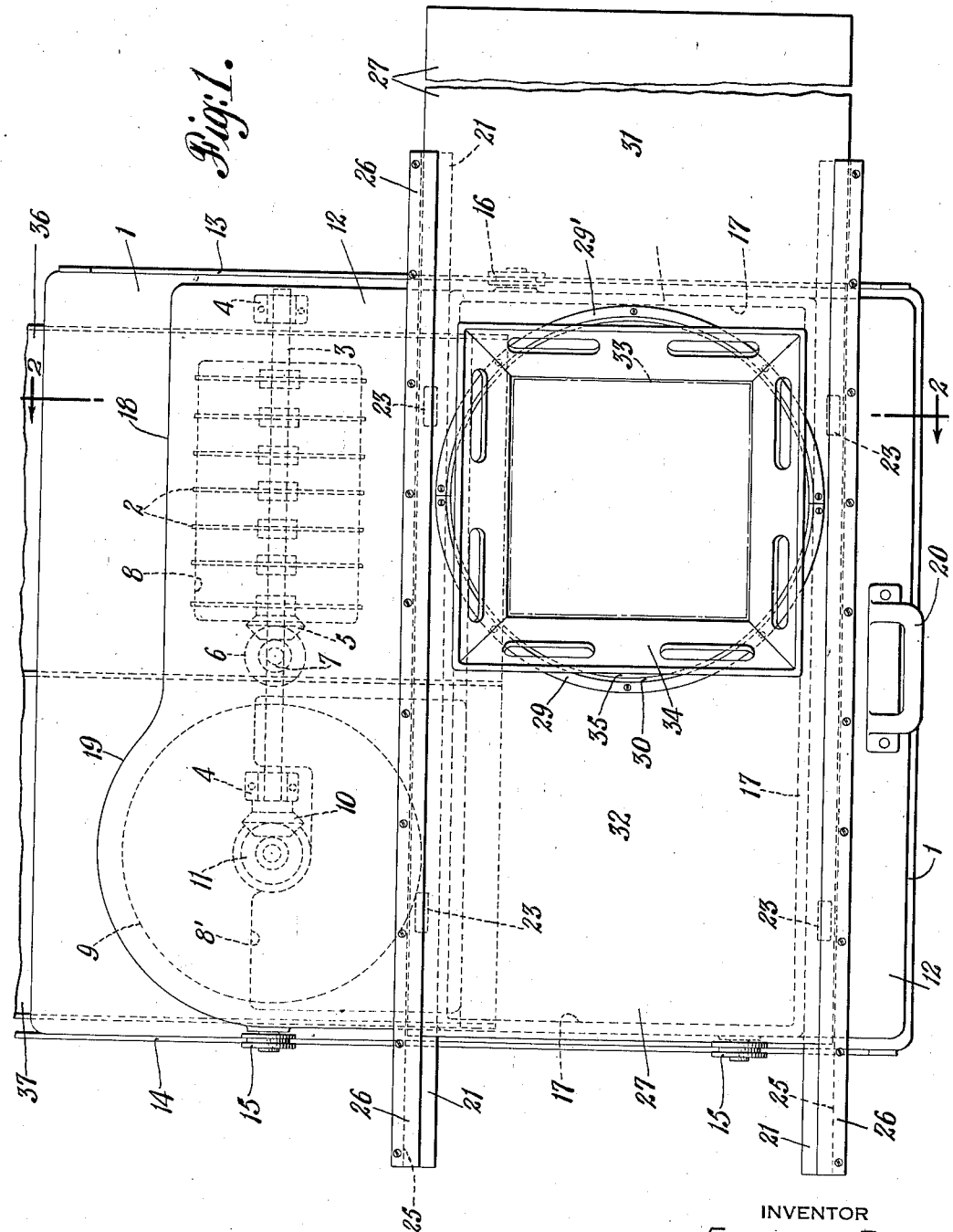
Figure 2:
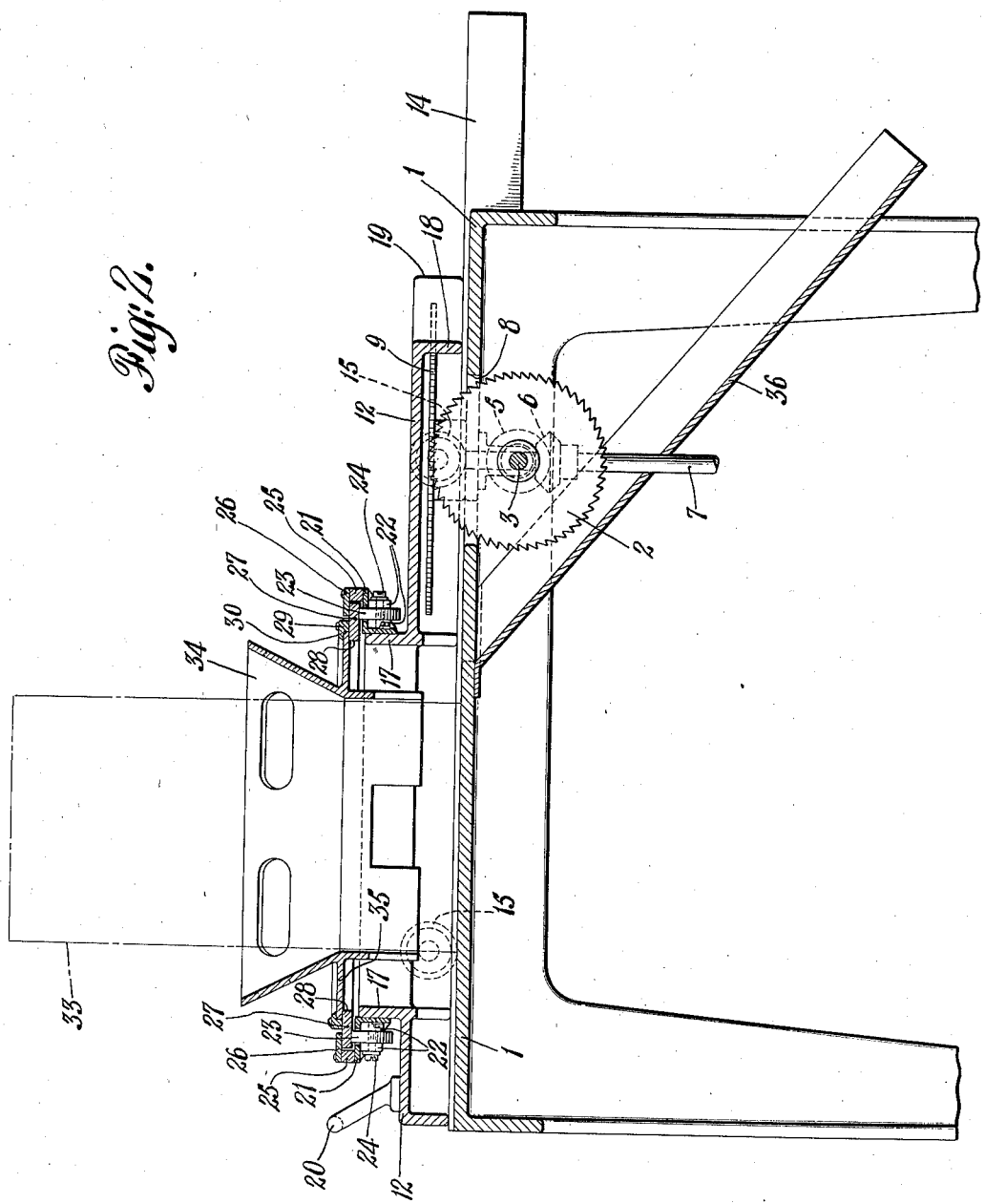

In the preferred embodiment shown in the drawings forming a part of this specification, Fig. 1 is a plan view of an ice-cubing machine showing the ice hopper in alinement with the kerfing saws, and Fig. 2 is a sectional view taken substantially along the line 2—2 of Fig. 1.

The ice cubing apparatus comprises a saw table 1 supporting the kerfing and cut-off saws and upon which the carriage is slidably mounted. The kerfing saws 2 are secured to a horizontal shaft 3 supported in bearings 4 and driven by the bevel gears 5 and 6 from the vertical shaft 7. The latter may be driven by an electric motor (not shown) or by other suitable means. As clearly shown in Fig. 2, the kerfing saws 2 project through slots 8 in the saw table 1, a distance corresponding to one dimension of the desired ice cubes. These saws are spaced along the shaft 3 according to the other dimensions of the cubes. Seven kerfing saws are shown but it will be understood that this number may be varied to accommodate different sizes of ice blocks and to cut various sizes of cubes.

The horizontal cut-off saw 9 is located above the surface of the saw table the same distance that the kerfing saws project. It is driven from the shaft 3 by the bevel gears 10 and 11.

A carriage 12 for transporting the ice block to and from the saws is slidably mounted on the saw table 1 by means of rollers on the underside of the carriage. Rails 13 and 14 are secured to the sides of the saw table and project slightly above its surface as shown in Fig. 2, the rail 14 being somewhat longer than 13 so that it may support both of the rollers 15 on that side of the carriage when the latter is in working position. A single roller 16 is sufficient for the other side of the carriage and accordingly its rail need not be quite so long. It will be seen that the carriage has up-turned flanges 17 which outline an opening in the carriage adapted to accommodate the block of ice. As will be apparent from the subsequent description of the safety device and its operation, this opening is greater in width than the longest horizontal diagonal of the block of ice, to enable the block to be turned in it, and, as shown in Fig. 1, it extends substantially the full width of the carriage.

The carriage is also provided with aprons 18 and 19 in alinement with the kerfing and cut-off saws, respectively and a handle 20 to facilitate its longitudinal movement on the saw table. It will be observed that whenever the carriage is in the retracted position shown in the drawings, all the saws are fully protected by the aprons. However, when the carriage has been pushed forward into working position so that the large opening therein overlies the saws, one set of saws will be covered by the block of ice but the other saw, or saws, will be fully exposed with the attendant possibility of injury to the operator. This was the principal defect of the existing ice cubing machines prior to the present improvements.

The safety device will now be described. On each of the transverse flanges 17 on the carriage there is secured, on the outside, a bracket 21, which may be, and preferably is, substantially in the form of an angle bar (see Fig. 2). These brackets are longer than the width of the carriage and project beyond either side thereof as shown in Fig. 1. At two, or more, points intermediate the ends of the brackets, there are depending bosses 22 opposite one another and between which a roller 23 is mounted rotatably upon a pin 24 screwed into one of the bosses. As will be seen from Fig. 2, these rollers project through slots in the upper surfaces of the brackets 21.

A transversely slidable table, hereinafter described, is mounted upon these rollers and guided between the strips 25 at the outside edges of the brackets 21 and is held down by the members 26 on top of the strip 25. The members 26 overhang the side edges of the table as shown in Fig. 2.

This slidable table 27, is a large flat plate having a circular central opening 28 surrounded by two semicircular guides 29 and 29' bolted to the table. These guides have an inwardly projecting flange 30. The end portions, or panels, 31 and 32 of the table may be designated as the kerf-protecting and cut-off-protecting parts, respectively, because they cover these saws during the cutting operations.

The block of ice 33 to be cubed is placed in the hopper 34 and rests upon the saw table. This hopper is provided with a circular flange 35, the edges of which lie on the transversely slidable table 27 and under flange 30 on the semi-circular guides 29 and 29'. The hopper may be rotated freely in these guides so that the block of ice may be kerfed at right angles. The upper sides of the hopper are preferably flared outwardly to facilitate placing the ice block therein. The flared sides may be slotted to provide grips for the operator who need not hold the ice with his hands.

After the block of ice has been placed in the hopper 34 and the latter is brought into alinement with the kerfing saws 2, as shown in Fig. 1, the operator pushes the carriage 12 forward and a plurality of kerfs are cut in the under side of the block. While the carriage is in this working position, the part 32 of the table overlies the cut-off saw, thus protecting the hands of the operator from injury. The carriage is then retracted to its original position and the hopper 34 rotated 90 degrees. When the carriage 12 is again pushed forward the kerfing saws cut the ice at right angles to the previous kerfs and the cut-off saw is covered as before. The cubes are now ready for severance from the block by the cut-off saw. The "snow" which has been produced by these kerfing actions falls through opening 8, and down the snow chute 36 and is removed.

After the carriage 12 has been retracted once more, the transversely slidable table is moved so that the block of ice is brought into alinement with the cut-off saw 9. The carriage is then pushed forward and the cubes are severed from the block by this saw. During this operation the panel 31 of the table covers the kerfing saws. The severed cubes fall through opening 8', in table 1, and down the chute 37, similar to the snow chute 36, to a suitable receptacle or belt conveyor as desired.

The terms "longitudinal" and "transverse" are used herein to designate movements at substantially right angles to one another and not in the sense of absolute directions with respect to the positions of the saws. It will also be appreciated that the various saws may occupy different relative positions from those illustrated which may necessitate different relative movements of the carriage and table. Also other modifications may be made without departing from the scope of the present invention.

I claim:

1. An ice cubing machine comprising a plurality of kerfing saws and a cut-off saw, a carriage movable perpendicularly to the axes of all of said saws and provided with a projecting portion covering all saws when none is in use, a table slidable transversely of the movement of the carriage and having an opening therein in which the ice to be cubed is placed and provided with panels on opposite sides of said opening, one of said panels overlying the cut-off saw when the kerfing saws are in use and the other panel overlying the kerfing saws when the cut-off saw is in use.

2. An ice cubing machine comprising a plurality of kerfing saws and a cut-off saw, a carriage movable perpendicularly to the axes of all of said saws and provided with a projecting portion covering all the saws when none is in use, a table slidable transversely of the movement of said carriage, a hopper rotatably supported on said table, said table being provided with panels on opposite sides of said hopper, one of said panels overlying the cut-off saw when the kerfing saws are in use and the other panel overlying the kerfing saws when the cut-off saw is in use.

3. An ice cubing machine comprising a plurality of kerfing saws and a cut-off saw, a carriage movable perpendicularly to the axes of all of said saws and provided with a projecting portion covering all the saws when none is in use, a table slidable on said carriage longitudinally to the movement thereof, a hopper rotatably supported on said table and provided with ice-supporting projections below said table and divergent sides above said table, said table being provided with panels on opposite sides of said hopper, one of said panels overlying the cut-off saw when the kerfing saws are in use and the other panel overlying the kerfing saws when the cut-off saw is in use.

4. An ice cubing machine comprising a plurality of kerfing saws and a cut-off saw, a carriage movable perpendicularly to the axes of all of said saws and provided with two parallel, upwardly projecting flanges extending parallel with the axes of the kerfing saws, a substantially flat member slidably supported above said flanges, an open top hopper having parallel lower sides for supporting the ice block to be cubed, a flange extending from the sides of said hopper and having a circular edge, said flat member having a complementary recess for said flange whereby said hopper may be rotated about its own axes.

FERDINAND FINK.